(12) United States Patent
Cline et al.

(10) Patent No.: US 10,038,397 B2
(45) Date of Patent: Jul. 31, 2018

(54) MULTIPLE ENGINE CONDITION MATCHING VIA ELECTRICAL POWER EXTRACTION CONTROL

(71) Applicants: Rolls-Royce Corporation, Indianapolis, IN (US); Rolls-Royce North American Technologies, Inc., Indianapolis, IN (US)

(72) Inventors: Curtis Harvey Cline, Brownsburg, IN (US); Michael P. Dougherty, Indianapolis, IN (US); Richard Joseph Skertic, Carmel, IN (US); Robert J. Zeller, Noblesville, IN (US)

(73) Assignees: Rolls-Royce Corporation, Indianapolis, IN (US); Rolls-Royce North American Technologies, Inc., Indianapolis, IN (US)

( * ) Notice: Subject to any disclaimer, the term of this patent is extended or adjusted under 35 U.S.C. 154(b) by 0 days.

(21) Appl. No.: 15/441,280

(22) Filed: Feb. 24, 2017

(65) Prior Publication Data
US 2017/0324360 A1 Nov. 9, 2017

Related U.S. Application Data

(60) Provisional application No. 62/333,730, filed on May 9, 2016.

(51) Int. Cl.
*F02D 25/00* (2006.01)
*F02D 29/06* (2006.01)
(Continued)

(52) U.S. Cl.
CPC ................ *H02P 9/04* (2013.01); *F01D 15/10* (2013.01); *F01D 21/003* (2013.01); *F02B 63/04* (2013.01);
(Continued)

(58) Field of Classification Search
USPC .......... 290/4 A; 60/204, 226.1; 701/100, 112
See application file for complete search history.

(56) References Cited

U.S. PATENT DOCUMENTS

| 4,258,545 A | 3/1981 | Slater |
| 5,048,285 A | 9/1991 | Schmitt et al. |

(Continued)

FOREIGN PATENT DOCUMENTS

| EP | 2851759 A1 | 3/2015 |
| EP | 2889711 A2 | 7/2015 |

OTHER PUBLICATIONS

U.S. Appl. No. 15/586,136, filed May 3, 2017, by Boyd et al.
(Continued)

*Primary Examiner* — Pedro J Cuevas
(74) *Attorney, Agent, or Firm* — Shumaker & Sieffert, P.A.

(57) ABSTRACT

A multi-engine power system is described that includes a load requiring a total amount of electrical power, a first engine configured to provide a first portion of the total amount of electrical power to be provided to the load, and a second engine configured to provide a second portion of the total amount of electrical power to be provided to the load. The system further includes a controller configured to determine the total amount of electrical power to be provided to the load, estimate a respective service time associated with each of the first and second engines, and control each of the first and second engines to provide the total amount of electrical power to the load and to coordinate the respective service times associated with the first and second engines.

20 Claims, 4 Drawing Sheets

(51) Int. Cl.
*H02P 9/04* (2006.01)
*F02B 63/04* (2006.01)
*F01D 15/10* (2006.01)
*F01D 21/00* (2006.01)
*F02D 41/22* (2006.01)
*H02K 7/18* (2006.01)
*B63H 11/00* (2006.01)

(52) U.S. Cl.
CPC ........... *F02D 41/22* (2013.01); *H02K 7/1815* (2013.01); *H02K 7/1823* (2013.01)

(56) References Cited

U.S. PATENT DOCUMENTS

| | | | | |
|---|---|---|---|---|
| 7,870,915 | B2* | 1/2011 | Beeson | B60P 3/14 180/53.1 |
| 7,908,911 | B2* | 3/2011 | Renner | G01F 1/8468 73/114.52 |
| 8,464,526 | B2* | 6/2013 | Renner | B60P 3/14 60/431 |
| 8,627,797 | B2* | 1/2014 | Renner | B60P 3/14 123/179.4 |
| 8,893,679 | B2* | 11/2014 | Renner | B60P 3/14 123/179.4 |
| 9,206,780 | B2* | 12/2015 | Renner | B60P 3/14 |
| 9,505,394 | B2* | 11/2016 | Falkenstein | B60K 6/48 |
| 2008/0122195 | A1* | 5/2008 | Beeson | B60K 25/00 280/151 |
| 2009/0194067 | A1* | 8/2009 | Peotter | B66C 23/42 123/350 |
| 2010/0199655 | A1* | 8/2010 | Renner | B60P 3/14 60/431 |
| 2010/0318283 | A1* | 12/2010 | Renner | B60P 3/14 701/112 |
| 2012/0138405 | A1* | 6/2012 | Falkenstein | B60K 6/48 192/3.54 |
| 2014/0129118 | A1* | 5/2014 | Renner | B60P 3/14 701/112 |
| 2015/0073684 | A1* | 3/2015 | Renner | B60P 3/14 701/112 |
| 2015/0185111 | A1 | 7/2015 | Armstrong et al. | |
| 2015/0369138 | A1 | 12/2015 | Phillips et al. | |

OTHER PUBLICATIONS

Litt et al., "A Survey of Intelligent Control and Health Management Technologies for Aircraft Propulsion Systems", NASA, U.S. Army Research Laboratory, May 2005, 28 pgs.

Behbahani et al., "A Feasibility Study of Life-Extending Controls for Aircraft Turbine Engines Using a Generic Air Force Model", Proceedings of GT2006 ASME Turbo Expo 2006, May 8-11, 2006, 9 pgs.

Extended Search Report from counterpart European Application No. 17166003.8, dated Oct. 10, 2017, 7 pp.

Response to Extended Search Report dated Oct. 10, 2017, from counterpart European Application No. 17166003.8 filed May 14, 2018, 8 pp.

* cited by examiner

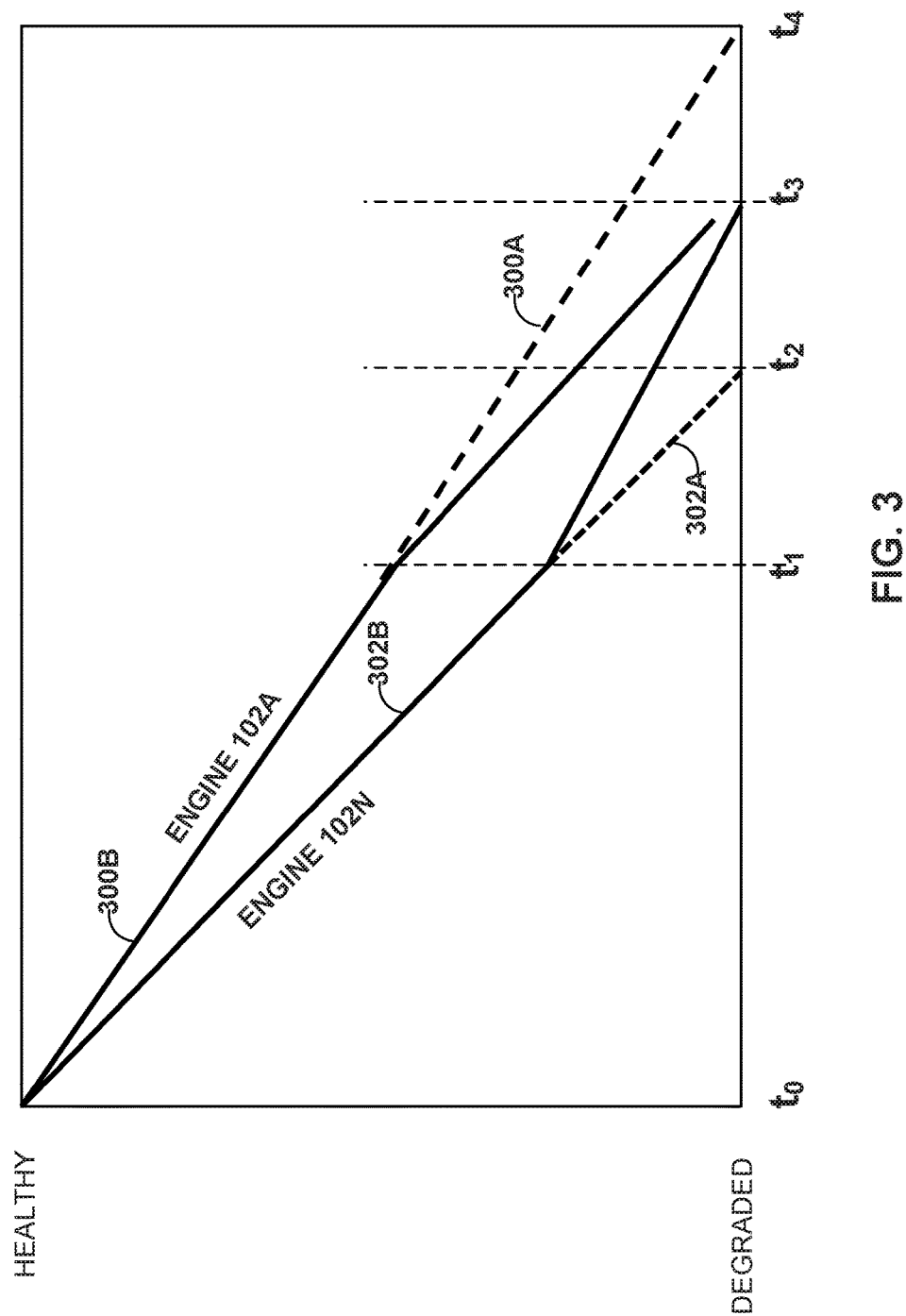

MULTIPLE ENGINE CONDITION MATCHING VIA ELECTRICAL POWER EXTRACTION CONTROL

This application claims the benefit of U.S. Provisional Application No. 62/333,730 filed May 9, 2016, which is incorporated herein by reference in its entirety.

GOVERNMENT RIGHTS

The present application was made with the United States government support under Contract No. W911W6-14-2-0006 awarded by the United States Army. The United States government may have certain rights in the present application.

TECHNICAL FIELD

The disclosure relates to techniques for electrical power management in multi-engine systems.

BACKGROUND

Some systems rely on engines to drive generators for producing electrical power for the system. These systems may vary the electrical power output of an electrical machine (e.g., alternator, generator, or other electrical power producing machine) by controlling the engine or engines that are driving the electrical power producing machine, at different speeds. Mechanical components and operational characteristics of an engine may degrade over time. Eventually a system may need to be taken offline so an engine that has degraded can be overhauled or even replaced. As each engine is unique and degrades at a different rate, the individual engines in a multi-engine power system may reach their respective service time or end-of-life at different times. To avoid having to take a multi-engine system offline each time a particular engine reaches its respective service time or end-of-life, all of the engines of the multi-engine system may be replaced when one engine needs replacing, even though the other engines may still possess at least some useful life.

SUMMARY

In one example, the disclosure is directed to a method that includes determining, by a controller of a multi-engine power system, a total amount of electrical power to be provided to a load of the multi-engine power system, wherein the multi-engine power system includes: a first engine configured to provide a first portion of the total amount of electrical power to be provided to the load, and a second engine configured to provide a second portion of the total amount of electrical power to be provided to the load. The method further includes estimating, by the controller, a respective service time associated with each of the first and second engines, and controlling, by the controller, each of the first and second engines to provide the total amount of electrical power to the load and to coordinate the respective service times associated with the first and second engines.

In another example, the disclosure is directed to a multi-engine power system that includes a load requiring a total amount of electrical power, a first engine configured to provide a first portion of the total amount of electrical power to be provided to the load, and a second engine configured to provide a second portion of the total amount of electrical power to be provided to the load. The multi-engine power system further includes a controller configured to determine the total amount of electrical power to be provided to the load, estimate a respective service time associated with each of the first and second engines, and control each of the first and second engines to provide the total amount of electrical power to the load and to coordinate the respective service times associated with the first and second engines.

In yet another example, the disclosure is directed to a system that includes means for determining a total amount of electrical power to be provided to a load of a multi-engine power system, wherein the multi-engine power system includes: a first engine configured to provide a first portion of the total amount of electrical power to be provided to the load, and a second engine configured to provide a second portion of the total amount of electrical power to be provided to the load. The system further includes means for estimating a respective service time associated with each of the first and second engines, and means for controlling each of the first and second engines to provide the total amount of electrical power to the load and to coordinate the respective service times associated with the first and second engines.

The details of one or more examples are set forth in the accompanying drawings and the description below. Other features, objects, and advantages of the disclosure will be apparent from the description and drawings, and from the claims.

BRIEF DESCRIPTION OF DRAWINGS

FIG. 3 is a conceptual diagram illustrating degradation rates of two different engines of an example multi-engine system that is configured to control electrical power extraction from the two engines to coordinate service time between the two engines, in accordance with one or more aspects of the present disclosure.

DETAILED DESCRIPTION

Figure 1:
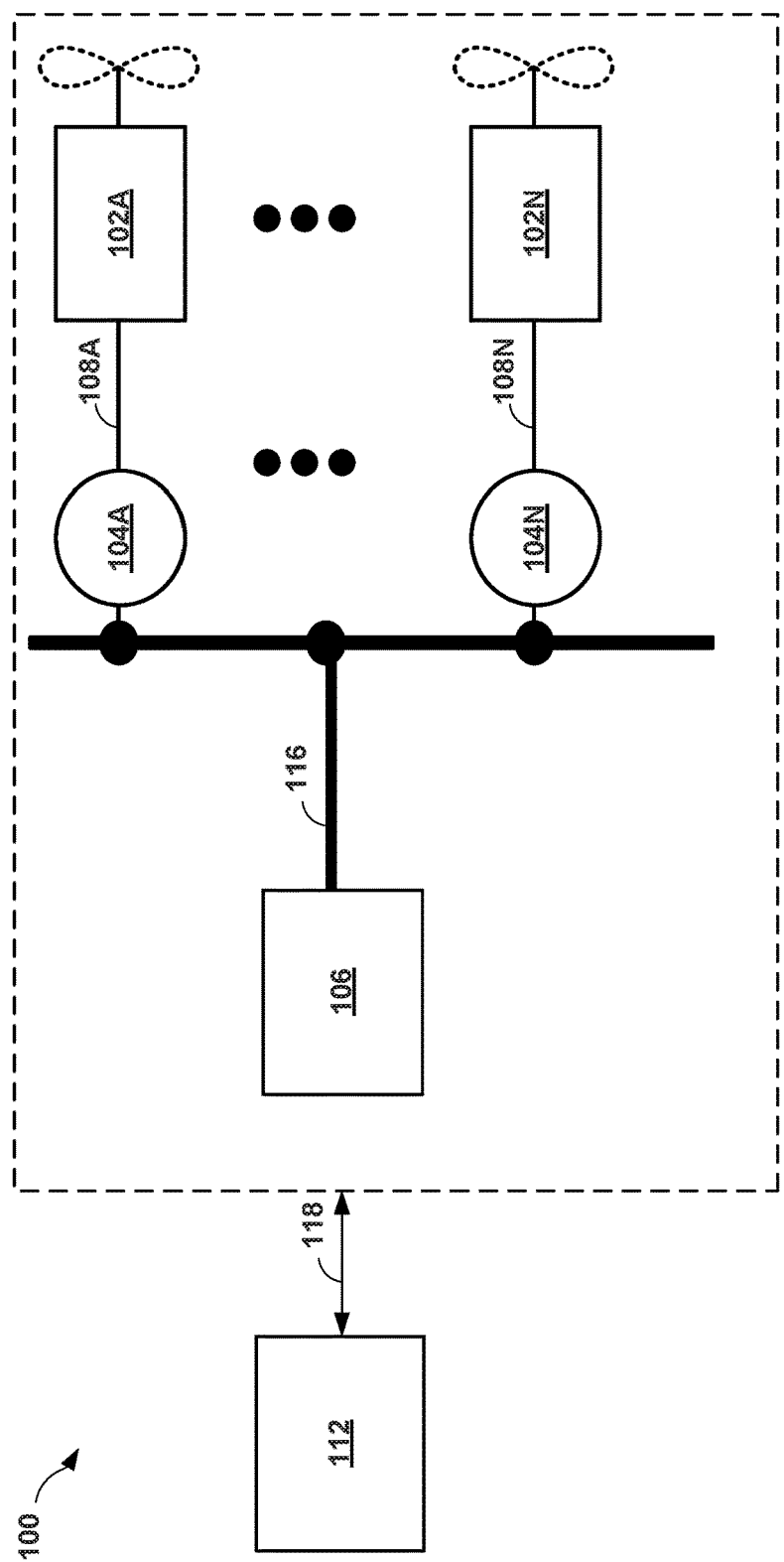
FIG. 1 is a conceptual diagram illustrating an example multi-engine system configured to control electrical power extraction from multiple engines to coordinate service time between the multiple engines, in accordance with one or more aspects of the present disclosure.

In general, techniques and circuits of this disclosure may enable an example controller of a multiple engine power system to manage the electrical power being extracted from one or more of the engines so as to coordinate the respective service times between the multiple engines. For example, a multi-engine system, such as an aircraft, may draw electrical power from one or more generators, alternators, or other electrical power producing machines that are being mechanically driven by multiple engines. In some cases each engine may mechanically drive a respective electrical machine and in other cases, two or more engines may mechanically drive a single electric machine. Nevertheless, the example controller may dynamically manage the electrical power drawn from one or more electrical machines to affect mechanical output of one or more of the engines.

Unlike other multi-engine system controllers that manage engine output primarily to satisfy electrical or mechanical power requirements of the system, the example controller described herein also considers service times associated with each engine when determining how much electrical power to extract from each engine at any given time. For instance, the example controller may dynamically determine a remaining service time for each engine as the engines are operational and providing electrical power to the system. Based on the remaining service time of each engine, the example controller may vary the amount of electrical power being extracted from each engine, in real-time, so as to not only satisfy the electrical power requirements of the system at a particular time, but also to cause each engine to reach its service time at approximately the same time. For example, the example controller may extract more electrical power from one engine that is degrading at a slower rate to increase the degradation rate of the engine and may extract less electrical power from a different engine that is degrading at a faster rate to reduce the degradation rate of the engine, so that the two engines will reach a service time (e.g., end-of-life, or other service milestone) at approximately the same time.

In this way, the example controller may not only control the engines in the system to achieve electrical power and mechanical power (e.g., thrust, shaft power, or other mechanical power) requirements of the system, but may also control the engines to increase a likelihood that each engine in the system will be ready to be serviced, overhauled, and/or replaced at approximately the same time. By controlling the electrical output of the engines in a multi-engine system in this way, the example controller may minimize the frequency with which the system needs to be taken offline for maintenance and increase the amount of time between removal and overhaul for all engines in the system. In addition, for systems that replace each engine in the system whenever one engine in the system reaches its end-of-life, the example controller may increase a likelihood that each of the other engines in the system are also at or near a point in their life cycle when the engines of the system should be replaced. As such, a multi-engine system that relies on the example controller may experience less down time and cost less to maintain as compared to other systems.

As used herein, the term "service time" of an engine corresponds to any milestone in the life cycle of an engine at which it may be desirable to replace, perform maintenance, overhaul, repair, or otherwise service the engine. For example, the service time of an engine may correspond to the end-of-life of the engine or the next maintenance milestone of the engine.

The service time of an engine may depend on a variety of factors, including variations in: manufacturing conditions of the engine and components thereof (e.g., variations in quality, humidity, materials, etc.), operating stresses (e.g., throttle settings, torque settings, operating temperatures, acceleration loads, other stresses, etc.) environmental conditions (e.g., altitude variations, external temperature variations, humidity variations, etc.) and other factors (e.g., bird strikes, combat related damage, civilian accidents, maintenance or operator error, etc.).

The service time of an engine may occur naturally (e.g., through regular use) or occur suddenly (e.g., after a failure event) and may change over time. For instance, the service time of an engine that was previously set to occur at some future time may change and correspond to an earlier time (e.g., due to stressing the engine, bird strike, combat event, accident, etc.). In some examples, the service time of an engine that was previously set to occur at some future time may change and become immediate, corresponding to a current time (e.g., due to a catastrophic failure event from combat, accident, over-stressing, other failure condition).

FIG. 1 is a conceptual diagram illustrating an example multi-engine system 100 configured to control electrical power extraction from multiple engines to coordinate service time between the multiple engines, in accordance with one or more aspects of the present disclosure. Electric propulsion system 100 represents any multi-engine system that extracts electrical power from the mechanical output of multiple engines. For ease of description, system 100 is described primarily as being an aircraft power system. However, many other examples of system 100 exist. For example, system 100 may be part of a power system onboard a marine craft, space craft, or other vehicle, a power plant for providing power to a power grid, or any other type of power system that relies on the mechanical output from multiple engines to produce electricity.

System 100 includes engines 102A-102N (collectively "engines 102"), electrical machines 104A-104N (collectively "electrical machines 104"), load 106, and electrical power bus 116. In addition, system 100 includes controller 112 which is operationally coupled to some or all of components 102, 104, and 106 via communication link 118. In other examples, system 100 may include additional or fewer components than those shown.

Power bus 116 is configured to distribute the electrical current (e.g., AC or DC) provided by each of electrical machines 104 to load 106. Load 106 represents any number of electrical components that utilize electrical power from a multi-engine power system such as system 100. For example, when system 100 is part of an aircraft, load 106 may be any number of lighting components, avionics components, pumps, communication systems, computer systems, display systems, cabin comfort systems, or any other electrical component or subsystem of the aircraft.

Each of electrical machines 104 represents one or more electrical power producing machines, such as one or more generators, alternators, or the like, that individually produces electrical power from mechanical output that is derived from an engine of a multi-engine system. For ease of description, each of electrical machines 104 is referred to as being a generator.

Generator 104A is shown in FIG. 1 as being mechanically coupled to engine 102A via mechanical shaft 108A. When engine 102A is running, engine 102A may spin mechanical shaft 108A to cause generator 104A to output electrical power to power bus 116. The amount of electrical power produced by each of generators 104 may depend on the speed of the respective mechanical shaft attached to the respective one of generators 104. In some examples, each respective one of generators 104 is coupled to a respective one of mechanical shafts 108 via a gearbox or other mechanical coupling (not shown in FIG. 1).

Although shown as having a respective generator 104 for each of engines 102, in some examples, system 100 may share a single one of generators 104 between a group of two or more engines 102. That is, in some instances, engines 102A and 102N may be mechanically coupled (e.g., via a gearbox and associated shafting that is not shown in FIG. 1) to a single one of generators 104 such that the shared output from engines 102A and 102N may simultaneously drive the same one of generators 104 and engines 102B and 102C (not shown) may be mechanically coupled to a different one of generators 104 such that the shared output from engines 102B and 102C drives a different, same one of generators 104. In accordance with techniques of this disclosure, controller 112 may control electrical power being extracted from engines 102A and 102N so as to affect the service times of engines 102A and 102N so that they run out with the service times of engines 102B and 102C.

Each of engines 102 represents any mechanical power source that is configured to produce mechanical energy from which electrical power can be derived or extracted. In some examples, engines 102 may produce mechanical energy for providing thrust, shaft power, or mechanical power for other components or subsystems, such as propellers, fans, fuel pumps, hydraulic pumps and other equipment. For example, as shown in FIG. 1, each of engines 102 may be mechanically coupled to a propeller or fan (e.g., a propulsor) for producing thrust. Examples of engines 102 include gas turbine engines, internal combustion engines, such as piston or rotary engines, or any other type of engine that mechanically drives one or more generators 104. The mechanical output from each of engines 102 can be individually controlled by controller 112. For example, controller 112 may control the speed at which engine 102A spins mechanical shaft 108A independently of the speed with which controller 112 causes engine 102N to spin mechanical shaft 108N.

In some examples, for instance, on a multi-engine aircraft, each engine 102 may include multiple shafts 108. For example, often times each of engines 102 may have two or more shafts (e.g., an intermediate pressure shaft, a high pressure shaft, a low pressure shaft, etc.). Respective electrical generators 104 may be coupled to one or more shafts 108 and used to provide electrical power to load 106.

In any case, by load 106 consuming electrical power from generators 104, load 106 is extracting power from the thermodynamic cycles of engines 102. This power extraction by load 106 will affect the thermodynamic cycle of each of engines 102 thereby impacting fuel consumption, operating temperatures, and pressures in each of engines 102.

Each of engines 102 may be at a different stage in its respective service time or life cycle when that engine is installed in system 100. For example, engine 102N may be been installed in system 100 as a new engine, hours, months or even years before engine 102A is installed as a new engine in system 100. Therefore, when engine 102A is installed in system 100, engine 102A may inherently have a longer remaining operating life as compared to engine 102N since engine 102N was installed and ran for some time prior to engine 102A being installed.

Even if each of engines 102 are at the same stage in their respective service times or operating life cycles when installed in system 100, and each of engines 102 has similar power and torque ratings, each of engines 102 is unique and may degrade at different rates over time. For example, due to variations in manufacturing conditions, operating conditions, environmental conditions, and other factors, engine 102A may or may be required to work harder (e.g., run faster, hotter, etc.) during its life to produce the same amount of mechanical power as engine 102N. Eventually, over time, even if both engines 102A and 102N are controlled so as to produce the same or similar amounts of mechanical power, engines 102A and 102N may reach different points in their respective service times of life cycles at different times. For example, engine 102A may degrade more quickly than engine 102N and need to be maintained, overhauled, and/or replaced before engine 102N needs similar servicing.

In general, controller 112 may control the power being extracted from engines 102 that is being converted to electrical power by generators 104 and provided via power bus 116 to load 106. Controller 112 is shown in FIG. 1 as being operationally coupled to each of components 102, 104, and 106 via communication link 118, which may be a wired or wireless communication link. In some examples, controller 112 may be operationally coupled to a subset of components 102, 104, and 106. Controller 112 may exchange information across communication link 118 between components 102, 104, and 106, and any other components of system 100 to cause power bus 116 to distribute, and refrain from distributing, electrical power to load 106. In some instances, controller 112 may communicate via communication link 118 with other control modules of system 100 (not shown in FIG. 1), such as respective engine control modules associated with engines 102, to vary or manage the electrical power being supplied via power bus 116 to load 106.

While controller 112 may coordinate electrical power consumption from, and degradation of, engines 102, controller 112 may also control engines 102 to ensure overall performance requirements (e.g., total electrical, mechanical, shaft, and/or thrust power) of system 100 are being met. For example, controller 112 may control engines 102 to ensure a total amount of thrust, shaft power, or particular fuel consumption is being provided by engines 102 in addition to ensuring that engines 102 are providing sufficient electrical power to loads 106.

Controller 112 may comprise any suitable arrangement of hardware, software, firmware, or any combination thereof, to perform the techniques attributed to controller 112 herein. Examples of controller 12 include any one or more microprocessors, digital signal processors (DSPs), application specific integrated circuits (ASICs), field programmable gate arrays (FPGAs), or any other equivalent integrated or discrete logic circuitry, as well as any combinations of such components. When controller 121 includes software or firmware, controller 112 further includes any necessary hardware for storing and executing the software or firmware, such as one or more processors or processing units.

In general, a processing unit may include one or more microprocessors, DSPs, ASICs, FPGAs, or any other equivalent integrated or discrete logic circuitry, as well as any combinations of such components. Although not shown in FIG. 1, controller 112 may include a memory configured to store data. The memory may include any volatile or non-volatile media, such as a random access memory (RAM), read only memory (ROM), non-volatile RAM (NVRAM), electrically erasable programmable ROM (EEPROM), flash memory, and the like. In some examples, the memory may be external to controller 112 (e.g., may be external to a package in which controller 112 is housed).

Rather than control electrical power extraction from engines 102 based entirely on the electrical requirements of load 106 and other electrical components of system 100, controller 112 is configured to control electrical power extraction from engines 102 by coordinating service time between engines 102. Controller 112 may adjust the amount of electrical power that is being extracted by generators 104 from each of engines 102 such that each of engines 102 simultaneously degrades to a particular servicing level (e.g., overhaul, maintenance milestone, end-of-life, etc.) at approximately the same time.

Controller 112 may operate with an objective of causing all engines 102 to reach end-of-life or some other common service time, at approximately the same time. For example, controller 112 may extract electrical power from each engine 102 differently, as needed, to decrease the rate of degradation of the most degraded engine 102 (less electrical power extraction) while increasing the rate of degradation of the least degraded engines 102 (more electrical power extraction). By reducing the amount of electrical power being extracted from the most degraded engines and increasing the amount of electrical power being extracted from the least degraded engines, controller 112 may force the individual degradations of engines 102 to converge toward a common service point, as usage of system 100 proceeds.

By controlling the electrical output of the engines in an example multi-engine system in this way, an example controller, such as controller 112, may minimize the frequency with which the system needs to be taken offline for maintenance and increase the amount of time between removal and overhaul for all the engines in system. As such, the example multi-engine system may experience less down time and cost less to maintain as compared to other systems.

Figure 2A:
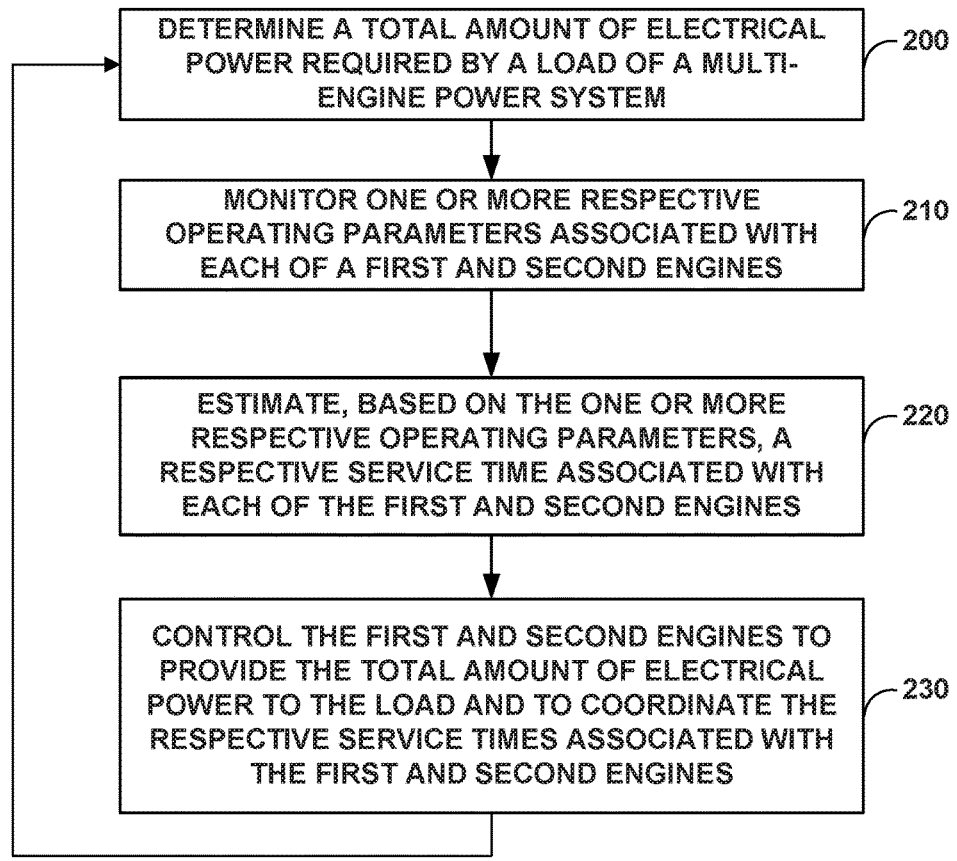
FIGS. 2A and 2B are flow charts illustrating example operations performed by an example controller configured to control electrical power extraction from multiple engines to coordinate service time between the multiple engines, in accordance with one or more aspects of the present disclosure.
Figure 2B:
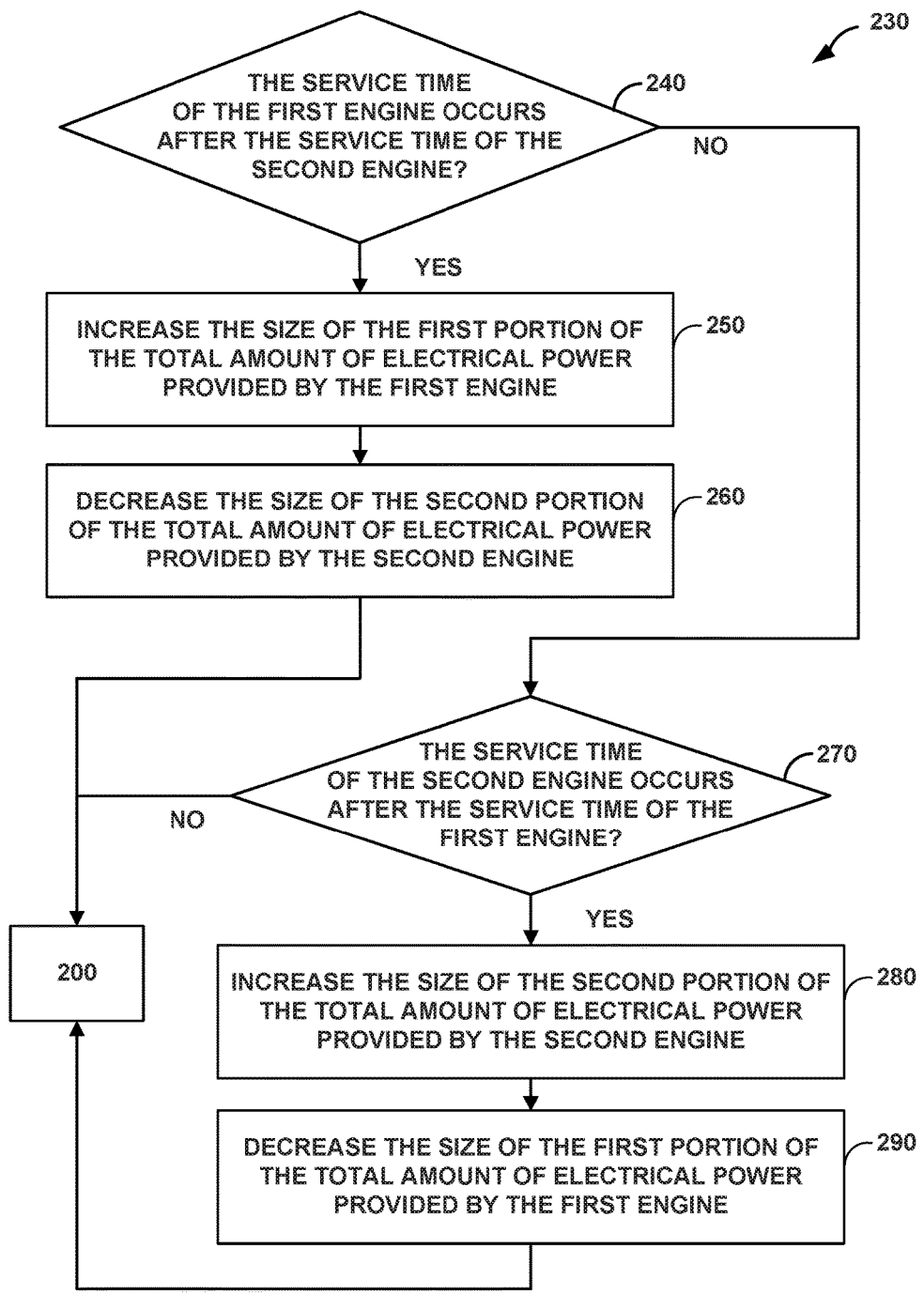

FIGS. 2A and 2B are flow charts illustrating example operations performed by an example controller configured to control electrical power extraction from multiple engines to coordinate end-of-life conditions between the multiple engines, in accordance with one or more aspects of the present disclosure. FIGS. 2A and 2B are described in the context of the components of system 100 of FIG. 1, although the technique of FIG. 2 may be implemented by other systems including additional or fewer components.

As shown in FIG. 2A, in accordance with techniques of this disclosure, controller 112 may determine a total amount of electrical power to provide to load 106 of system 100 (200). For example, controller 112 may communicate via link 118 with load 106 and the various other systems and subsystems associated with system 100 to determine the total electrical power required from generators 104 and engines 102. Controller 112 may determine the total electrical power to be provided to load 106 and system 100 so that when controller 112 adjusts the electrical power extraction from engines 102 to coordinate degradation of engines 102, controller 112 can ensure engines 102 still provide sufficient electrical power to system 100.

While controller 112 causes engines 102 to provide electrical power that is sufficient to power load 106 of system 100, controller 112 may monitor one or more operating parameters associated with each of engines 102 (210) in order to estimate a respective service time or end-of-life associated with each of engines 102. For example, controller 112 may monitor operating temperatures, shaft speeds, hours of usage, pressures, amounts of electrical and mechanical output, and other operating parameters associated with engines 102 to obtain information about the respective degradation levels of each of engines 102.

Controller 112 may measure the one or more respective operating parameters associated with engines 102 over prior time durations (e.g., one or more minutes, hours, and/or days of prior operation) and input the measured operating parameters into a model, algorithm, lookup table, or other calculation unit for estimating, predicting, or projecting when each of engines 102 will reach its respective end-of-life or other service time. For example, controller 112 may rely on a model, algorithm, lookup table, or other calculation unit that is built from prior engine data collected over time for a particular one of engines 102, or from other, similar engines. The model, algorithm, lookup table, or other calculation unit may project the current performance of a particular engine onto a degradation glide slope that the model, algorithm, lookup table, or other calculation unit uses to estimate an end-of-life, or other service milestone of that particular engine. The model, algorithm, lookup table, or other calculation unit may determine a particular operating time (e.g., calendar time, hours of usage time, etc.) at which, given the current operating temperature, pressure, and output for a particular command (e.g., a particular throttle setting, amount of electrical power being extracted, etc.) of a particular one of engines 102, that the particular one of engines 102 will fail, need replacing, or otherwise need servicing. Controller 112 may input one or more operational parameters of each a particular one of engines 102 into the model, algorithm, lookup table, or other calculation unit, and in response, the model, algorithm, lookup table, or other calculation unit may output a projected service time or end-of-life associated with that particular one of engines 102.

Controller 112 may estimate a respective service time associated with each of engines 102 (220). For example, controller 112 may estimate a future time (e.g., operating time or calendar time) when, given the current measured operating parameters of engines 102A and 102N, that engines 102A and 102N will each reach their respective end-of-life or otherwise need servicing. Controller 112 may determine that, given the current amounts of electrical power being extracted from engines 102A and 102N, that engine 102A is degrading faster than engine 102N and will therefore reach its end-of-life sooner than engine 102N.

Controller 112 may control each of engines 102 to provide the total amount of electrical power to load 106 and to coordinate the respective service times associated engines 102 (230). For example, to balance the degradations of engines 102A and 102N, controller 112 may adjust at least one of a size of the first portion of the total amount of electrical power provided by engine 102A or a size of the second portion of the total amount of electrical power provided by engine 102N to coordinate the respective service times associated with the first and second engines. For instance, if engine 102A is degrading faster than engine 102N, controller 112 may ease up on or reduce drawing as much electrical power from engine 102A and instead draw more electrical power from engine 102N.

Controller 112 may control each of engines 102 to approximately match the respective service times associated with engines 102. For instance, controller 112 may continuously monitor the operating parameters of engines 102 and continuously adjust the electrical power being extracted from each to ensure that each of engines 102 reaches end-of-life or a similar stage in the degradation cycle, at approximately the same time.

In addition to coordinating service times across engines 102, controller 112 may continue to manage and control engines 102 to meet mechanical power output requirements of system 100. For example, to maintain a total amount of mechanical power (e.g., thrust, shaft power, etc.) provided by each of engines 102, while providing the total amount of electrical power needed by load 106 and coordinating the respective service times associated engines 102, controller 112 may increase mechanical power output from engine 102N in addition to the electrical power draw from engine 102N, to further compensate for a loss in mechanical power from engine 102A that may occur due to running engine 102A more slowly to reduce electrical power provided by engine 102A.

FIG. 2B shows operation 230 of FIG. 2A in greater detail. As shown in FIG. 2B, controller 112 may determine whether the service time of engine 102A occurs after the service time of engine 102N (240). For example, controller 112 may input the measured operating parameters of each of engines 102A and 102N into a model, algorithm, lookup table, or other calculation unit and determine which of engines 102A and 102N will reach its end-of-life sooner.

Responsive to determining that the respective service time associated with engine 102A occurs after the respective service time associated with engine 102N (240, YES branch), controller 112 may increase the size of the first portion of the total amount of electrical power provided by engine 102A (250) and decrease the size of the second portion of the total amount of electrical power provided engine 102N (260). In other words, if controller 112 determines that engine 102A is degrading slower or will otherwise reach its end-of-life after engine 102N reaches its end-of-life, controller 112 may increase the electrical power being extracted by system 100 from engine 102A to speed up its degradation. Similarly, if controller 112 determines that engine 102A is degrading slower or will otherwise reach its end-of-life after engine 102N reaches its end-of-life, controller 112 may decrease the electrical power being extracted by system 100 from engine 102N to slow down its degradation. In some examples, the size of the first portion of the total amount of electrical power being extracted from engine 102A may be increased sufficiently to compensate for the decrease in the size of the second portion being extracted from engine 102N.

FIG. 2B shows the alternative case where responsive to determining that the respective service time associated with engine 102A does not occur after the respective service time associated with engine 102N (240, NO branch), controller 112 may determine whether the service time of engine 102N occurs after the service time of engine 102A (270). If controller 112 determines that both engines 102A and 102N will reach their respective service end-of-life at approximately the same time, controller 112 may refrain from altering the amounts of electrical power being extracted from each.

However, controller 112 may increase the size of the second portion of the total amount of electrical power provided by engine 102N (280) and decrease the size of the first portion of the total amount of electrical power provided engine 102A (290) in response to determining that the respective service time associated with engine 102N occurs after the respective service time associated with engine 102A (270, YES branch)

In other words, if controller 112 determines that engine 102N is degrading slower or will otherwise reach its end-of-life after engine 102A reaches its end-of-life, controller 112 may increase the electrical power being extracted by system 100 from engine 102N to speed up its degradation. Similarly, if controller 112 determines that engine 102N is degrading slower or will otherwise reach its end-of-life after engine 102A reaches its end-of-life, controller 112 may decrease the electrical power being extracted by system 100 from engine 102A to slow down its degradation.

In some examples, the model, algorithm, lookup table, or other calculation unit relied on by controller 112 may be adjusted by further inputs to system 100 (e.g., from a user or another system or machine). For example, controller 112 may enable an operator of system 100 to select whether the operator wishes controller 112 to cause system 100 to have a particular fuel consumption mode, operate in a max power mode, or operate in a matched engine degradation mode. Controller 112 may operate in any of the given modes based on the operator input.

In some examples, controller 112 may further output (e.g., for display at a cockpit control or other operation or maintenance display) an estimated outcome of selecting each mode. For example controller 112 may output a graphical indication flight or maintenance crews that matched engine degradation mode should be selected for ensuring system 100 can operate for an additional "X" quantity of hours.

FIG. 3 is a conceptual diagram illustrating degradation rates of two different engines of an example multi-engine system that is configured to control electrical power extraction from the two engines to coordinate end-of-life conditions between the two engines, in accordance with one or more aspects of the present disclosure. FIG. 3 is described below in the context of system 100 of FIG. 1 as well as operations 200-290 of FIGS. 2A and 2B.

FIG. 3 includes degradation glide slopes 300A and 300B of engine 102A and degradation glide slopes 302A and 302B of engine 102N. As shown in FIG. 3, both engines 102A and 102N are "healthy" at time t0 or at least at the same degradation level. In some cases, engines 102A and 102N may be newly installed engines of system 100, newly overhauled, etc.

In any case, during operational use, engine 102N may degrade faster than engine 102A. For example, as illustrated by a comparison between degradation glide slopes 300A and 302A, either due to manufacturing differences or other characteristics that make engine 102A unique from engine 102N, given the current electrical power being extracted from engines 102A and 102N, controller 112 may estimate that engine 102N is expected to reach its end-of-life at approximately time t2 whereas engine 102A is expected to reach its end-of-life at approximately time t4.

Rather than continue to cause system 100 to extract electrical power from engines 102A and 102N in this way, controller 112 may alter its electrical power control scheme to compensate for the differences in degradation glide slopes 300A and 302A, and to coordinate the respective end-of-life of each of engines 102A and 102N. For example, controller 112 may increase the amount of electrical power being extracted from engine 102A so as to cause engine 102A to degrade faster and according to degradation glideslope 300B. Controller 112 may decrease the amount of electrical power being extracted from engine 102N so as to cause engine 102N to degrade slower and according to degradation glideslope 302B. Controller 112 may balance the mechanical and electrical workloads between engines 102A and 102N so as to continue to satisfy the electrical and mechanical power needs of system 100 while causing engines 102A and 102N to reach their respective end-of-life at approximately the same time (e.g., at time t3).

Clause 1. A multi-engine power system comprising: a load requiring a total amount of electrical power; a first engine configured to provide a first portion of the total amount of electrical power to be provided to the load; a second engine configured to provide a second portion of the total amount of electrical power to be provided to the load; and a controller configured to: determine the total amount of electrical power to be provided to the load; estimate a respective service time associated with each of the first and second engines; and control each of the first and second engines to provide the total amount of electrical power to the load and to coordinate the respective service times associated with the first and second engines.

Clause 2. The multi-engine power system of clause 1, wherein the controller is configured to control each of the first and second engines to provide the total amount of electrical power to the load and to coordinate the respective service times associated with the first and second engines by at least adjusting at least one of a size of the first portion of the total amount of electrical power provided by the first engine or a size of the second portion of the total amount of electrical power provided by the second engine to coordinate the respective service times associated with the first and second engines.

Clause 3. The multi-engine power system of clause 2, wherein the controller is configured to adjust the at least one of a size of the first portion of the total amount of electrical power provided by the first engine or a size of the second portion of the total amount of electrical power provide by the second engine to coordinate the respective service times associated with the first and second engines by at least: responsive to determining that the respective service time associated with the first engine occurs after the respective service time associated with the second engine: increase the size of the first portion of the total amount of electrical power provided by the first engine; and decrease the size of the second portion of the total amount of electrical power provided by the second engine.

Clause 4. The multi-engine power system of clause 3, wherein the controller is further configured to increase the size of the first portion of the total amount of electrical power sufficiently to compensate for the decrease in the size of the second portion.

Clause 5. The multi-engine power system of any one of clauses 1-4, wherein the controller is configured to control each of the first and second engines to provide the total amount of electrical power to the load and to coordinate the respective service times associated with the first and second engines by at least controlling the first and second engines to approximately match the respective service times associated with the first and second engines.

Clause 6. The multi-engine power system of any one of clauses 1-5, wherein the controller is configured to estimate the respective service time associated with each of the first and second engines by at least: monitoring one or more respective operating parameters associated with each of the first and second engines; and estimating, based on the one or more respective operating parameters associated with each of the first and second engines, the respective service time associated with each of the first and second engines.

Clause 7. The multi-engine power system of clause 6, wherein the one or more respective operating parameters associated with each of the first and second engines includes at least one of temperature, shaft speed, or hours of usage.

Clause 8. The multi-engine power system of any one of clauses 6-7, wherein the controller is further configured to monitor the one or more respective operating parameters associated with each of the first and second engines by at least measuring, over a prior duration of time, the one or more respective operating parameters associated with each of the first and second engines.

Clause 9. The multi-engine power system of any one of clauses 6-8, wherein the controller is further configured to estimate the respective service time associated with each of the first and second engines by at least determining the respective service time associated with each of the first and second engines from a model based on the one or more respective operating parameters associated with each of the first and second engines that are measured over a prior duration of time Clause 10. A method comprising: determining, by a controller of a multi-engine power system, a total amount of electrical power to be provided to a load of the multi-engine power system, wherein the multi-engine power system includes: a first engine configured to provide a first portion of the total amount of electrical power to be provided to the load; and a second engine configured to provide a second portion of the total amount of electrical power to be provided to the load; estimating, by the controller, a respective service time associated with each of the first and second engines; and controlling, by the controller, each of the first and second engines to provide the total amount of electrical power to the load and to coordinate the respective service times associated with the first and second engines.

Clause 11. The method of clause 10, wherein controlling each of the first and second engines to provide the total amount of electrical power to the load and to coordinate the respective service times associated with the first and second engines comprises adjusting, by the controller, at least one of a size of the first portion of the total amount of electrical power provided by the first engine or a size of the second portion of the total amount of electrical power provided by the second engine to coordinate the respective service times associated with the first and second engines.

Clause 12. The method of clause 11, wherein adjusting the at least one of a size of the first portion of the total amount of electrical power provided by the first engine or a size of the second portion of the total amount of electrical power provide by the second engine to coordinate the respective service times associated with the first and second engines comprises: responsive to determining that the respective service time associated with the first engine occurs after the respective service time associated with the second engine: increasing, by the controller, the size of the first portion of the total amount of electrical power provided by the first engine; and decreasing, by the controller, the size of the second portion of the total amount of electrical power provided by the second engine.

Clause 13. The method of clause 12, wherein the size of the first portion of the total amount of electrical power is increased sufficiently to compensate for the decrease in the size of the second portion.

Clause 14. The method of any one of clauses 10-13, wherein controlling each of the first and second engines to provide the total amount of electrical power to the load and to coordinate the respective service times associated with the first and second engines comprises controlling, by the controller, the first and second engines to approximately match the respective service times associated with the first and second engines.

Clause 15. The method of any one of clauses 10-14, wherein estimating the respective service time associated with each of the first and second engines comprises: monitoring, by the controller, one or more respective operating parameters associated with each of the first and second engines; and estimating, by the controller, based on the one or more respective operating parameters associated with each of the first and second engines, the respective service time associated with each of the first and second engines.

Clause 16. The method of clause 15, wherein the one or more respective operating parameters associated with each of the first and second engines includes at least one of temperature, shaft speed, or hours of usage.

Clause 17. The method of clauses 15 or 16, wherein monitoring the one or more respective operating parameters associated with each of the first and second engines comprises measuring, by the controller and over a prior duration of time, the one or more respective operating parameters associated with each of the first and second engines.

Clause 18. The method of any one of clauses 15-17, wherein estimating the respective service time associated with each of the first and second engines comprises determining the respective service time associated with each of the first and second engines from a model based on the one or more respective operating parameters associated with each of the first and second engines that are measured over a prior duration of time Clause 19. The method of any one of clauses 10-18, further comprising: maintaining, by the controller, a total amount of thrust power or shaft power provided by each of the first and second engines while controlling the first and second engines to provide the total amount of electrical power to the load and to coordinate the respective service times associated with the first and second engines.

Clause 20. A system comprising: means for determining a total amount of electrical power to be provided to a load of a multi-engine power system, wherein the multi-engine power system includes: a first engine configured to provide a first portion of the total amount of electrical power to be provided to the load; and a second engine configured to provide a second portion of the total amount of electrical power to be provided to the load; means for estimating a respective service time associated with each of the first and second engines; and means for controlling each of the first and second engines to provide the total amount of electrical power to the load and to coordinate the respective service times associated with the first and second engines.

Clause 21. The system of clause 17, further comprising means for performing any one of the methods of clauses 7-16.

Clause 22. A computer-readable storage medium comprising instructions that, when executed, cause at least one processor of a controller of a propulsion system to perform method of any one of clauses 7-16.

Clause 23. The system of claim 1, wherein the controller is further configured to perform the method of any one of clauses 7-16.

In one or more examples, the operations described may be implemented in hardware, software, firmware, or any combination thereof. If implemented in software, the operations may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a processor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A multi-engine power system comprising:
a load requiring a total amount of electrical power;
a first engine configured to provide a first portion of the total amount of electrical power to be provided to the load;
a second engine configured to provide a second portion of the total amount of electrical power to be provided to the load; and
a controller configured to:
determine the total amount of electrical power to be provided to the load;
estimate a respective service time associated with each of the first and second engines; and
control each of the first and second engines to provide the total amount of electrical power to the load and to coordinate the respective service times associated with the first and second engines.

2. The multi-engine power system of claim 1, wherein the controller is configured to control each of the first and second engines to provide the total amount of electrical power to the load and to coordinate the respective service times associated with the first and second engines by at least adjusting at least one of a size of the first portion of the total amount of electrical power provided by the first engine or a size of the second portion of the total amount of electrical power provided by the second engine to coordinate the respective service times associated with the first and second engines.

3. The multi-engine power system of claim 2, wherein the controller is configured to adjust the at least one of a size of the first portion of the total amount of electrical power provided by the first engine or a size of the second portion of the total amount of electrical power provide by the second engine to coordinate the respective service times associated with the first and second engines by at least:

responsive to determining that the respective service time associated with the first engine occurs after the respective service time associated with the second engine:
increase the size of the first portion of the total amount of electrical power provided by the first engine; and
decrease the size of the second portion of the total amount of electrical power provided by the second engine.

4. The multi-engine power system of claim 3, wherein the controller is further configured to increase the size of the first portion of the total amount of electrical power sufficiently to compensate for the decrease in the size of the second portion.

5. The multi-engine power system of claim 1, wherein the controller is configured to control each of the first and second engines to provide the total amount of electrical power to the load and to coordinate the respective service times associated with the first and second engines by at least controlling the first and second engines to approximately match the respective service times associated with the first and second engines.

6. The multi-engine power system of claim 1, wherein the controller is configured to estimate the respective service time associated with each of the first and second engines by at least:
monitoring one or more respective operating parameters associated with each of the first and second engines; and
estimating, based on the one or more respective operating parameters associated with each of the first and second engines, the respective service time associated with each of the first and second engines.

7. The multi-engine power system of claim 6, wherein the one or more respective operating parameters associated with each of the first and second engines includes at least one of temperature, shaft speed, or hours of usage.

8. The multi-engine power system of claim 6, wherein the controller is further configured to monitor the one or more respective operating parameters associated with each of the first and second engines by at least measuring, over a prior duration of time, the one or more respective operating parameters associated with each of the first and second engines.

9. The multi-engine power system of claim 6, wherein the controller is further configured to estimate the respective service time associated with each of the first and second engines by at least determining the respective service time associated with each of the first and second engines from a model based on the one or more respective operating parameters associated with each of the first and second engines that are measured over a prior duration of time.

10. A method comprising:
determining, by a controller of a multi-engine power system, a total amount of electrical power to be provided to a load of the multi-engine power system, wherein the multi-engine power system includes:
a first engine configured to provide a first portion of the total amount of electrical power to be provided to the load; and
a second engine configured to provide a second portion of the total amount of electrical power to be provided to the load;
estimating, by the controller, a respective service time associated with each of the first and second engines; and
controlling, by the controller, each of the first and second engines to provide the total amount of electrical power to the load and to coordinate the respective service times associated with the first and second engines.

11. The method of claim 10, wherein controlling each of the first and second engines to provide the total amount of electrical power to the load and to coordinate the respective service times associated with the first and second engines comprises adjusting, by the controller, at least one of a size of the first portion of the total amount of electrical power provided by the first engine or a size of the second portion of the total amount of electrical power provided by the second engine to coordinate the respective service times associated with the first and second engines.

12. The method of claim 11, wherein adjusting the at least one of a size of the first portion of the total amount of electrical power provided by the first engine or a size of the second portion of the total amount of electrical power provide by the second engine to coordinate the respective service times associated with the first and second engines comprises:
responsive to determining that the respective service time associated with the first engine occurs after the respective service time associated with the second engine:
increasing, by the controller, the size of the first portion of the total amount of electrical power provided by the first engine; and
decreasing, by the controller, the size of the second portion of the total amount of electrical power provided by the second engine.

13. The method of claim 12, wherein the size of the first portion of the total amount of electrical power is increased sufficiently to compensate for the decrease in the size of the second portion.

14. The method of claim 10, wherein controlling each of the first and second engines to provide the total amount of electrical power to the load and to coordinate the respective service times associated with the first and second engines comprises controlling, by the controller, the first and second engines to approximately match the respective service times associated with the first and second engines.

15. The method of claim 10, wherein estimating the respective service time associated with each of the first and second engines comprises:
monitoring, by the controller, one or more respective operating parameters associated with each of the first and second engines; and
estimating, by the controller, based on the one or more respective operating parameters associated with each of the first and second engines, the respective service time associated with each of the first and second engines.

16. The method of claim 15, wherein the one or more respective operating parameters associated with each of the first and second engines includes at least one of temperature, shaft speed, or hours of usage.

17. The method of claim 15, wherein monitoring the one or more respective operating parameters associated with each of the first and second engines comprises measuring, by the controller and over a prior duration of time, the one or more respective operating parameters associated with each of the first and second engines.

18. The method of claim 15, wherein estimating the respective service time associated with each of the first and second engines comprises determining the respective service time associated with each of the first and second engines from a model based on the one or more respective operating parameters associated with each of the first and second engines that are measured over a prior duration of time.

19. The method of claim 10, further comprising:
  maintaining, by the controller, a total amount of thrust power or shaft power provided by each of the first and second engines while controlling the first and second engines to provide the total amount of electrical power to the load and to coordinate the respective service times associated with the first and second engines.

20. A system comprising:
  means for determining a total amount of electrical power to be provided to a load of a multi-engine power system, wherein the multi-engine power system includes:
    a first engine configured to provide a first portion of the total amount of electrical power to be provided to the load; and
    a second engine configured to provide a second portion of the total amount of electrical power to be provided to the load;
  means for estimating a respective service time associated with each of the first and second engines; and
  means for controlling each of the first and second engines to provide the total amount of electrical power to the load and to coordinate the respective service times associated with the first and second engines.

* * * * *